United States Patent [19]

Halpaap et al.

[11] Patent Number: 4,748,242
[45] Date of Patent: May 31, 1988

[54] TERTIARY POLYISOCYANATE DERIVATIVES

[75] Inventors: Reinhard Halpaap; Josef Pedain, both of Cologne; Hans-Joachim Kreuder, Krefeld; Gerhard Klein, Monheim; Dieter Arlt, Cologne, all of Fed. Rep. of Germany

[73] Assignee: Bayer Aktiengesellschaft, Bayerwerk, Fed. Rep. of Germany

[21] Appl. No.: 930,584

[22] Filed: Nov. 12, 1986

[30] Foreign Application Priority Data

Nov. 27, 1985 [DE] Fed. Rep. of Germany ....... 3541859

[51] Int. Cl.$^4$ .................. C07D 251/30; C07D 251/32
[52] U.S. Cl. ..................... 544/222; 544/193; 524/101; 528/65
[58] Field of Search ................. 544/193, 222; 528/65

[56] References Cited

U.S. PATENT DOCUMENTS

| | | | |
|---|---|---|---|
| 3,919,218 | 11/1975 | Schmitt et al. | 260/248 |
| 4,265,798 | 5/1981 | Mishra | 260/32.4 |
| 4,288,586 | 9/1981 | Bock et al. | 528/67 |
| 4,412,073 | 10/1983 | Robin | 544/193 |
| 4,454,317 | 6/1984 | Disteldorf et al. | 544/193 |
| 4,469,867 | 9/1984 | Disteldorf et al. | 544/222 |
| 4,487,928 | 12/1984 | Richter et al. | 544/193 |
| 4,537,961 | 8/1985 | Robin | 544/193 |
| 4,613,685 | 9/1986 | Klein et al. | 560/330 |

FOREIGN PATENT DOCUMENTS

| | | | |
|---|---|---|---|
| 100129 | 2/1984 | European Pat. Off. | 544/193 |
| 2616415 | 11/1977 | Fed. Rep. of Germany | 544/193 |
| 2901479 | 7/1980 | Fed. Rep. of Germany | 544/193 |
| 3219608 | 9/1983 | Fed. Rep. of Germany | 544/193 |
| 3507719 | 3/1985 | Fed. Rep. of Germany | 544/193 |
| 1386399 | 3/1975 | United Kingdom | 544/193 |
| 1391066 | 4/1975 | United Kingdom | 544/193 |

*Primary Examiner*—John M. Ford
*Assistant Examiner*—J. G. Mullins
*Attorney, Agent, or Firm*—Gene Harsh; Joseph C. Gil; Thomas W. Roy

[57] ABSTRACT

The present invention is directed to a process for the production of polyisocyanates containing isocyanurate groups by trimerizing a mixture of aliphatic-cycloaliphatic diisocyanates having a sterically unhindered isocyanate group bound to a primary aliphatic carbon atom and a sterically hindered isocyanate group bound to a tertiary carbon atom which forms a part of a cycloaliphatic ring system and 1,6-diisocyanatohexane. The present invention is also directed to the polyisocyanates containing isocyanurate groups produced according to this process and to their use, optionally in blocked form, as an isocyanate component in the production of polyisocyanate polyaddition products, preferably polyurethane lacquers.

7 Claims, No Drawings

TERTIARY POLYISOCYANATE DERIVATIVES

BACKGROUND OF THE INVENTION

1. Field of the Invention

This invention relates to a new process for the production of polyisocyanates containing isocyanurate groups based on mixtures of particular aliphatic-cycloaliphatic diisocyanates with 1,6-diisocyanatohexane, the polyisocyanates produced by this process and their use as an isocyanate component in polyisocyanate polyaddition products, preferably polyurethane lacquers.

2. Description of the Prior Art (Cyclo)aliphatic polyisocyanates containing isocyanurate groups are technically of the greatest interest as lacquer polyisocyanates. Whereas low molecular weight aliphatic diisocyanates cannot be used as such in lacquer binders because of their toxicological properties due to their still relatively high volatility, isocyanato-isocyanurates show a number of advantages. They are oligomers with a low vapor pressure which are substantially monomer-free. They have an isocyanate functionality of $\geq 3$, so that a high degree of cross-linking can be achieved. As aliphatic polyisocyanates they produce good light-fastness of the coatings obtained therefrom.

With respect to the production of polyisocyanates containing isocyanurate groups, the most varied processes have become known. These known processes generally differ in the selection of trimerization catalysts and also in the selection of the polyisocyanates to be used for the trimerization reaction (c.f. e.g. GB-PS No. 1,391,066, GB-PS No. 1,386,399, DE-OS No. 2,325,826, DE-OS No. 2,616,415, DE-OS No. 2,806,731, DE-OS No. 2,901,479, DE-OS No. 3,100,262, DE-OS No. 3,219,608, EP-PS No. 17,998, EP-OS No. 33,581, EP-OS No. 57,653, EP-OS No. 89,297, EP-PS No. 82,987 or EP-OS No. 100,129).

All of these processes suffer in principle from a substantial disadvantage. In order to obtain isocyanto-isocyanurates which are of low viscosity or have good solubility in lacquer solvents, the trimerization reaction must be terminated at a relatively low degree of trimerization (degree of trimerization=percentage of the isocyanate groups present in the starting isocyanates which are trimerized) and, further, in order to obtain a trimerization product with a low monomer content, a costly thin layer distillation must be carried out. Otherwise, in addition to the desired low viscosity monomeric isocyanurates with good solubility, relatively large quantities of oligoisocyanurates are formed (polyisocyanates which have more than one isocyanurate ring per molecule). This is due to the fact that the isocyanate groups of the starting diisocyanates generally have similar or only slightly different reactivities, such that both isocyanate groups of the starting diisocyanate are trimerized.

According to German Patent Application No. P 35 07 719.0 lacquer polyisocyanates containing isocyanurate groups based on aliphatic-cycloaliphatic diisocyanates may be produced without premature termination of the trimerization reaction due to the extremely different reactivities of the isocyanate groups of these special diisocyanates. The isocyanato-isocyanurates which can be obtained according to this application substantially contain the tris-isocyanato-isocyanurates corresponding to the diisocyanates used and produce valuable binder components for two-component polyurethane lacquers.

It has now been surprisingly found that a substantially analogous trimerization of mixtures of these special aliphatic-cycloaliphatic diisocyanates with 1,6-diisocyanatohexane results in isocyanato-isocyanurates which are more suitable as a binder component in two-component polyurethane lacquers than the products of the prior application. In particular the lacquer films produced with the products according to the invention have a higher elasticity than analogous lacquers based on the isocyanato-isocyanurates according to the prior application.

SUMMARY OF THE INVENTION

The present invention is directed to a process for the production of polyisocyanates containing isocyanurate groups by catalytically trimerizing a portion of the isocyanate groups of organic diisocyanates and optionally terminating the trimerization reaction at the desired degree of trimerization by adding a catalytic poison and/or by thermally deactivating the catalyst used, characterized in that mixtures of the following are used as starting diisocyanates (a) aliphatic-cycloaliphatic diisocyanates with an NCO content of about 20 to 50% by weight, which have a sterically unhindered isocyanate group bound to a primary aliphatic carbon atom and a sterically hindered isocyanate group which is bound to a tertiary carbon atom which forms part of a cycloaliphatic ring system, and (b) 1,6-diisocyanato-hexane (HDI) in a positive amount of up to 50 mol % of HDI, based on the total quantity of components (a) and (b)

The present invention is also directed to the polyisocyanates containing isocyanurate groups obtainable according to this process and to their use, optionally in blocked form, as an isocyanate component in the production of polyisocyanate polyaddition products, preferably polyurethane lacquers and most preferably heat-cross-linkable two-component polyurethane powder lacquers.

DETAILED DESCRIPTION OF THE INVENTION

In the process according to the invention mixtures of (a) aliphatic-cycloaliphatic diisocyanates with (b) 1,6-diisocyanatohexane are used as starting diisocyanates. Component (b) i.e. 1,6-diisocyanatohexane (HDI) is used in a positive amount of up to 50 mol %, i.e. the quantity of HDI is at least 1 mol %. preferably about 5 to 50 mol %, more preferably about 5 to 30 mol % and most preferably about 5 to 20 mol % of HDI, based on the total mixture of components (a) and (b).

Component (a) is based on aliphatic-cycloaliphatic diisocyanates with an NCO content of about 20 to 50, preferably about 30 to 48% by weight which in addition to a sterically unhindered, aliphatically-bound isocyanate group contains a sterically hindered, cycloaliphatically-bound isocyanate group. Starting diisocyanates (a) which are particularly suitable according to the invention are those of formula (I) or mixtures of these compounds

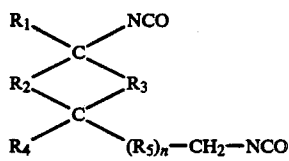

wherein $R_1$ represents an alkyl radical having from 1 to 4 carbon atoms, preferably a methyl radical, $R_2$ and $R_3$ represent identical or different radicals and in each case represent a bivalent straight or branched saturated hydrocarbon radical having from 1 to 4, preferably from 1 to 3 carbon atoms, whereby the sum of the carbon atoms of these radicals is preferably from 3 to 6, particularly 4 or 5, $R_4$ represents hydrogen or an alkyl radical having from 1 to 4 carbon atoms, preferably hydrogen or a methyl radical, $R_5$ represents a bivalent, straight or branched, saturated aliphatic hydrocarbon radical having from 1 to 4, particularly from 1 to 3 carbon atoms and n represents 0 or 1.

Particularly preferred diisocyanates (a) are, for example, 1-isocyanato-1-methyl-4(3)-isocyanatomethyl cyclohexane (which is generally present as a mixture of 4- or 3-isocyanatomethyl-isomers), 1-isocyanato-1-methyl-4-(4-isocyanatobut-2-yl)-cyclohexane, 1-isocyanato-1,2,2-trimethyl-3-(2-isocyanatoethyl)-cyclopentane or 1-isocyanato-1,4(3)-dimethyl-4(3)-isocyanatomethyl-cyclohexane (which is generally present in the form of its 4-methyl-4-isocyanatomethyl- and 3-methyl-3-isocyanatomethyl-isomer mixture). Other suitable compounds include 1-isocyanato-1-n-butyl-3-(4-isocyanatobut-1-yl)-cyclopentane, 1-isocyanato-1-ethyl4-n-butyl-4-(4-isocyanatobut-1-yl)-cyclohexane or 1-isocyanato-1,2-dimethyl-3-ethyl-3-isocyanatomethyl-cyclopentane.

The diisocyanates (a) can be produced, for example, by reacting unsaturated amines of the general formula (II)

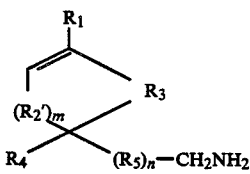

wherein $R_2'$ represents a bivalent, saturated, straight or branched hydrocarbon radical having from 1 to 3 carbon atoms, m represents 0 or 1 and $R_1$, $R_3$, $R_4$, $R_5$ and n have the same meaning as given above, or amino alcohols of the general formula (III),

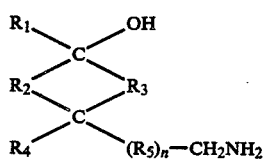

wherein $R_1$, $R_2$, $R_3$, $R_4$, $R_5$ and n are represented as given above, in a Ritter Reaction with hydrocyanic acid for conversion to the diamines of the general formula (IV),

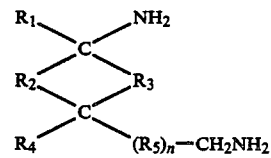

The diisocyanates of the general formula I are obtained from the diamines of the general formula IV by phosgenation.

The unsaturated amines of the general formula II are either known or can be recovered by catalytic hydrogenation from compounds of the general formula V,

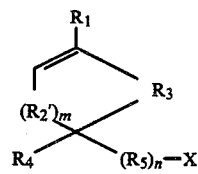

wherein

X represents —CHO or —CN and $R_1$, $R_2'$, $R_3$, $R_4$, $R_5$ and m and n have the same meaning as given above.

The basic substances of the general formula V can be obtained, for example, by the known Diels-Alder reaction from the corresponding bisolefins containing conjugated double bonds and unsaturated nitriles or aldehydes or by hydroformylation of the corresponding unsaturated hydrocarbons. Thus, the Diels-Alder adduct, for example, present as a position isomer mixture, of the formula VIa and VIb

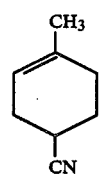

(VIa)

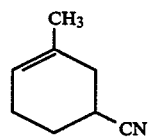

(VIb)

the basic substance of the 1-isocyanato-1-methyl-4(3)-isocyanatomethyl cyclohexane which is also present as a position isomer mixture. The compound of the formula VII obtainable by the hydroformylation of limonene

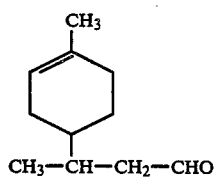

(VII)

is the basic substance of 1-isocyanato-1-methyl-4(4-isocyanatobut-2-yl)-cyclohexane. The corresponding basic substance of 1-isocyanato-1,2,2-trimethyl-3-(2-isocyanatoethyl)-cyclopentane is campholene aldehyde of the formula VIII

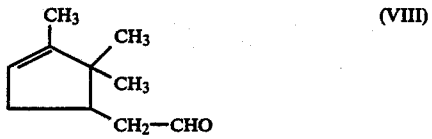

Further basic substances corresponding to the general formula V can be obtained in a similar manner to these embodiments by suitably selecting the starting materials used for their production. The compounds VI–VIII are furthermore acknowledged by literature (VI: Chem. Abstr. 71, 112475 F: VII: EP-A No. 0008459; VIII: Berichte der Deutschen Chemischen Gesellschaft 86 B 1430 (1935)).

The Ritter Reaction of unsaturated amines of the general formula II or the amino alcohols of the general formula III is carried out in the presence of a strong acid such as sulphuric acid, phosphoric acid, alkyl or aryl sulphonic acids or trifluoroacetic acid. Sulphuric acid is preferably used. The water content of the acid can be about 5 to 50%, preferably about 25 to 35%. About 1 to 3 mol, preferably 2 mol of acid are used per mol of unsaturated amine. Based on the unsaturated amine of the general formula II or the amino alcohol of the general formula III, an equimolar quantity or an excess of up to about 1 mol of hydrocyanic acid is used. In a preferred method, the unsaturated amine of the general formula II is added to the acid and subsequently the hydrocyanic acid is added. The temperature is kept between about 0° and 25° C. during the addition of the amine and between about 10 and 50° C., preferably between about 30° and 45° C. during the addition of the hydrocyanic acid. After a reaction time of about 2 to 10 hours, preferably about 4 to 6 hours, the produced formamide is acidically hydrolyzed and the formed diamine of the general formula IV is released by neutralization with a base such as a solution of sodium hydroxide.

The diamine of the general formula IV recovered by the Ritter Reaction can be phosgenated in a known manner. For this purpose, for example, the diamine is saturated in an inert solvent with carbon dioxide at temperatures of about 0° to 150° C., preferably about 80° to 100° C. The resulting addition product is then reacted at about 0° to 200° C., preferably about 120° to 150° C. with phosgene to form a diisocyanate of the general formula I. Any inert solvents can be used which have a sufficiently high boiling point for phosgenation and which have an adequate boiling point difference for subsequent separation from the diisocyanate. Chlorobenzenes, nitrobenzenes, xylenes, tetraline and decaline are preferred.

In another embodiment of phosgenation, the diamine is added in an inert solvent to a solution of phosgene in the same solvent at temperatures of about −20° C. to +50° C. The phosgene excess, based on the diamine, should be about 2 to 10 mol, preferably about 4 to 6 mol. A further reaction of the addition product to yield the diisocyanate then takes places at a temperature of about 20° to 200° C., preferably about 120° to 150° C.

The diisocyanates (a) obtained in this manner have an NCO content of about 20 to 50, preferably about 30 to 48% by weight and generally produce mixtures of stereo isomers. Furthermore, the diisocyanates which are obtained by a Diels-Alder reaction, particularly when using unsaturated nitriles of the general formula V as a basic substance, can be mixtures of position isomers.

Trimerization catalysts suitable for the process according to the invention include those previously known such as phosphines of the type described in DE-OS No. 1,935,763: alkali phenolates of the type described in GB-PS No. 1,391,066 or GB-PS No. 1,386,399; aziridine derivatives in combination with tertiary amines of the type described in DE-OS No. 2,325,826; Mannich bases for example based on i-nonylphenol, formaldehyde and dimethylamine of the type described in US-P 4,115,373; quaternary ammonium carboxylates of the type described in EP-OS No. 17,998; quaternary ammonium phenolates with a zwitterionic structure of the type described in US-P 4,335,219: ammonium phosphonates and phosphates of the type described in DE-OS No. 3,227,489: alkali carboxylates of the type described in DE-OS No. 3,219,608; and basic alkali metal salts in combination with phase transfer catalysts, as described by R. Richter, P. Müller and K. Wagner, Die Angewandte Makromolekulare Chemie 113, 1–9 (1983) such as potassium acetate complexed with a polyethylene glycol which contains an average from 5 to 8 ethylene oxide units.

Particularly suitable as catalysts for the process according to the invention are quaternary ammonium hydroxides of the general formula

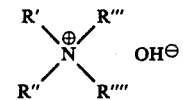

as described in DE-OS No. 2,806,731 and 2,901,479. Quaternary ammonium hydroxides are preferred wherein the radicals R' to R'''' represent identical or different alkyl groups having from 1 to 20, preferably from 1 to 4 carbon atoms, which may optionally be substituted by hydroxyl groups; where two of the named radicals R' to R'''' may form a heterocyclic ring having from 3 to 5 carbon atoms together with the nitrogen atom and optionally with a further nitrogen or oxygen atom: or the radicals R' to R''' in each case may represent ethylene radicals which form a bicyclic triethylene diamine structure together with the quaternary nitrogen atom and a further tertiary nitrogen atom, with the proviso that the radical R'''' then represents a hydroxyalkyl group having from 2 to 4 carbon atoms, the hydroxyl group preferably being arranged in a 2-position to the quaternary nitrogen atom. In the previous cases the hydroxyl-substituted radical or the hydroxyl-substituted radicals in addition to the hydroxyl substituent may also contain other substituents, particularly $C_1$ to $C_4$-alkoxy substituents. The production of the latter-described catalysts takes place in a known manner by reacting a tertiary amine with an alkylene oxide in an aqueous-alcoholic medium (c.f. U.S. Pat. No. 3,995,997, col. 2, lines 19–44). Examples of suitable tertiary amines include trimethylamine, tributylamine, 2-dimethylaminoethanol, triethanolamine, dodecyldimethylamine, N,N-dimethylcyclohexylamine, N-methylpyrrolidine, N-methylmorpholine and 1,4-diazabicyclo[2,2,2]-octane, while examples of suitable alkylene oxides include ethylene oxide, propylene oxide, 1,2-butylene oxide, styrene oxide or methoxy, ethoxy, phenoxy propylene oxide. Most particularly preferred catalysts from this group are N,N,N-trimethyl-N-(2-hydroxyethyl)-ammonium hydroxide and N,N,N-trimethyl-N-(2-hydroxypropyl)-ammonium hydroxide.

The trimerization of the starting mixtures of components (a) and (b) can specifically be carried out in the absence or in the presence of solvents which are inert to isocyanate groups. Depending on the area of application of the products according to the invention, low to medium-boiling solvents or high-boiling solvents can be used. The products generally initially remain dissolved when using esters such as ethyl acetate or butyl acetate, ketones such as acetone or butanone, aromatic substances such as toluene or xylene and halogenated hydrocarbons such as methylene chloride and trichloroethylene: whereas, they generally form a second phase or precipitate in ethers such as diisopropylether or alkanes such as cyclohexane, petroleum ether or ligroin.

The trimerization catalysts are generally used in quantities of about 0.005 to 5% by weight, preferably about 0.01 to 2% by weight, based on the diisocyanate used. If, for example, a preferred catalyst such as N,N,N-trimethyl-N-(2-hydroxypropyl)-ammonium hydroxide is used, then quantities of about 0.05 to 1% by weight, preferably about 0.07 to 0.7% by weight, based on starting diisocyanate, are generally sufficient. The catalysts may be used in pure form or in solution. The previously named solvents which are inert to isocyanate groups are suitable as solvents, depending on the type of catalysts, dimethyl formamide or dimethyl sulphoxide may also be used as solvents for the catalysts. When simultaneously using carbamic acid derivative-forming hydroxy compounds as co-catalysts, it is advantageous to also use these compounds as catalyst solvents. Examples include: methanol, ethanol, isopropanol, 2-ethylhexanol or glycols such as 1,2-dihydroxyethane, 1,2-dihydroxypropane, 1,3- and 1,4-dihydroxybutane, 1,6- and 2,5-dihydroxyhexane, 2-ethyl-1,3-dihydroxyhexane or 2,2,4-trimethyl-1,3-dihydroxypentane.

The simultaneous use of co-catalysts is possible in the process according to the invention, but not necessary. All substances from which a polymerizing effect on isocyanates is known are suitable as co-catalysts such as those described in DE-OS No. 2,806,731. The co-catalysts are optionally used in a deficient amount on a weight basis in relation to the trimerization catalysts; exceptions are the described hydroxy compounds which function simultaneously as co-catalysts forming carbamic acid derivatives and as catalyst solvents and can be used in excess in relation to the catalyst.

The reaction temperature for trimerization in the process according to the invention is about 20° to 200° C., preferably about 40° to 160° C. and most preferably about 40 to 120° C. In the absence of inert solvents, a temperature of about 60° to 120° C. is preferably used.

The process according to the invention may take place, for example, in the manner described below. The starting mixture of components (a) and (b) is introduced with the exclusion of moisture and optionally with an inert gas into a suitable stirring vessel and mixed, for example, with equal parts of a solvent which is inert to isocyanate groups such as toluene, butyl acetate, diisopropylether or cyclohexane. At a temperature of about 60° C. and in the presence of the required catalyst or catalyst solution the trimerization begins and is indicated by an exothermic reaction. The reaction mixture of components (a) and (b) particularly of (a) 1-isocyanato-1-methyl- 4(3)-isocyanato-methyl cyclohexane or (a) 1-isocyanato-1,4(3)-dimethyl-4(3)-isocyanatomethyl cyclohexane and (b) HDI is kept, for example, at 80° C. and the continuation of the reaction is followed by NCO-content titration. The reaction can then be terminated at the desired degree of trimerization. The termination of the trimerization reaction can take place, for example, at a degree of trimerization of about 50% to 80%, particularly about 52.5 to 70%, i.e. when the content of isocyanate groups of the reaction mixture has fallen to a value of about 50% to 20%, particularly about 47.5 to 30% of the starting value, depending on the selected quantity ratio of components (a) and (b).

Since 1,6-diisocyanatohexane, component (b), has a higher reactivity in the trimerization reaction than component (a), the HDI is generally completely incorporated in the products according to the invention by reaction of both isocyanate groups. If the termination of the trimerization reaction takes place at a degree of trimerization such that the isocyanate groups of component (b) have completely reacted and at least 50 % of the isocyanate groups of component (a) have reacted, this corresponds, when using a mixture of (a) and (b) in a molar ratio of 80:20, to a degree of trimerization of 60%. The product generally contains a total of less than 2, preferably less than 1% of free (unreacted) monomeric diisocyanates (a) and (b).

The termination of the trimerization reaction can take place, for example, by the addition of a catalyst-poison of the type named by way of example in the above-mentioned literature references. For example, when using basic catalysts the reaction is terminated by the addition of a quantity, which is at least equivalent to the catalyst quantity, of an acid chloride such as benzoyl chloride. When using heat-labile catalysts, for example, quaternary ammonium hydroxides of the above-described type, poisoning of the catalyst by the addition of a catalyst-poison may be dispensed with, since these catalysts decompose in the course of the reaction. When using such catalysts, the catalyst quantity and the reaction temperature are preferably selected such that the catalyst which continuously decomposes is totally decomposed when the desired degree of trimerization is reached. The quantity of catalyst or reaction temperature which is necessary to achieve this decomposition can be determined by a preliminary experiment. It is also possible initially to use a lesser quantity of a heat-sensitive catalyst than is necessary to achieve the desired degree of trimerization and to subsequently catalyze the reaction by a further incremental addition of catalyst, whereby the quantity of catalyst added later is calculated such that on achieving the desired degree of trimerization, the total quantity of catalyst is spent. When using covalent solvents such as toluene, the use of suspended catalysts is also possible. These catalysts are removed on achieving the desired degree of trimerization by filtering the reaction mixture. However, because of the selective reactivity of the isocyanate groups of component (a) and the fact that 1,6-diisocyanatohexane is practically completely incorporated in the products due to its relatively high reactivity, the question of destruction or removal of the catalyst at the desired degree of trimerization is much less critical than in the known processes of the prior art since the possibility exists to a much greater extent than in the process according to the invention, that all of the isocyanate groups of the starting diisocyanate will be trimerized.

The reaction frequently comes to a standstill after incorporation of both of the isocyanate groups of component (b) and after trimerization of the aliphatically-bound isocyanate groups of component (a) without destruction or removal of the catalyst due to the low reactivity of the isocyanate groups bound to the tertiary carbon atoms of starting diisocyanate (a).

The working-up of the reaction mixture, optionally after previous separation of insoluble catalyst constituents, can take place in various ways depending on how the reaction was conducted and the area of application for the isocyanates. It is possible to use an isocyanato-isocyanurate produced in solution directly as a lacquer raw material, without a purification stage, particularly without thin layer distillation, if it has a monomer content of <1% by weight. It is also possible to directly use as a lacquer isocyanate component with a low monomer content, a trimerized mixture containing (a) 1-isocyanato-1-methyl4(3)-isocyanatomethyl cyclohexane with (b) HDI, which precipitates as a solid resin after cooling. A solvent mixture such as diisopropylether/petroleum ether, can also be used, for example in the production of an isocyanurate based on (a) 1-isocyanato-1-methyl-4(3)-isocyanatomethyl cyclohexane and (b) HDI, so that the product can be precipitated and filtered off during the cooling process as a crystalline, white powder. The solvent used during trimerization can also be removed by distillation, for example after the complete reaction of the aliphatically-bound isocyanate group of component (a) and both isocyanate groups of component (b).

The products according to the invention are isocyanato-isocyanurates which have an NCO content of about 10 to 21% by weight and which produce resins which are solid at room temperature with a melt range generally below about 120° C. The products according to the invention are generally mixtures of predominantly triisocyanato-monoisocyanurates and tetraisocyanato bis-isocyanurates with higher homologues having more than two isocyanurate rings.

The products according to the invention are valuable starting materials for the production of polyisocyanate polyaddition products by reaction with compounds containing at least two isocyanate reactive groups. Preferred products are most preferably one or two-component polyurethane lacquers.

Preferred reaction partners for the products according to the invention, which may optionally be present in blocked form, are the polyhydroxy polyesters or ethers, polyhydroxy polyacrylates and optionally low molecular weight, polyhydric alcohols known in polyurethane lacquer technology. Polyamines, particularly in blocked form, for example as polyketimines or zolidines are also suitable reaction partners for the process products according to the invention. The amounts of the products according to the invention and their reaction partners are selected to provide about 0.8 to 3 and preferably about 0.9 to 1.1, hydroxy, amino and/or carboxyl groups for each (optionally blocked) isocyanate group.

To accelerate hardening, the catalysts which are conventional in isocyanate chemistry can be used in known manner, for example, tertiary amines, such as triethylamine, pyridine, methyl pyridine, benzyl dimethylamine, N,N-dimethylamino cyclohexane, N-methyl piperidine, pentamethyl diethylene triamine, 1,4-diazabicyclo-[2,2,2]-octane and N,N'-dimethyl piperazine; or metal salts such as iron(III)-chloride, zinc chloride, zinc-2-ethyl caproate, tin(II)-ethyl caproate, dibutyltin(IV)-dilaurate and molybdenum glycolate.

The products according to the invention can also serve as valuable starting materials for two-component polyurethane stoving enamels. They may be used in a form blocked by the known blocking agents. However, they may be used in two-component stoving enamels without previously masking the isocyanate groups due to the unreactive nature of the tertiary-bound isocyanate groups of the products according to the invention.

In such systems, the blocking process stage is thereby omitted with the benefit that no blocking agent is released during the stoving process. If, however, blocking of the NCO groups is desired, then the procedure can be carried out in known manner. The polyisocyanate is completely or partially blocked with suitable blocking agents, preferably at an elevated temperature (e.g. about 40° to 160° C.), optionally in the presence of a suitable catalyst, for example, tertiary amines or metal salts of the type previously mentioned.

Suitable blocking agents include monophenols such as phenol, the cresols, the trimethylphenols and the tert. butyl phenols: tertiary alcohols such as tert. butanol, tert. amyl alcohol and dimethylphenyl carbinol; compounds which easily form enols such as acetoacetic ester, acetyl acetone and malonic acid derivatives, e.g. malonic acid diethylester; secondary aromatic amines such as N-methyl aniline, the N-methyl toluidines, N-phenyl toluidine and N-phenyl xylidine; imides such as succinimide; lactams such as $\epsilon$-caprolactam and $\delta$-valerolactam; oximes such as butanone oxime and cyclohexanone oxime; mercaptans such as methyl mercaptan, ethyl mercaptan, butyl mercaptan, 2-mercaptobenzthiazole, $\alpha$-naphthyl mercaptan and dodecyl mercaptan: and triazoles such as 1H-1,2,4-triazole.

For the production of the lacquer binders, an optionally blocked polyisocyanate, polyfunctional reaction partner, catalyst and optionally other conventional additives such as pigments, dyes, fillers and levelling agents are mixed with each other and homogenized on a conventional mixing assembly such as a sandmill, either with or without solvent and diluent. They can then be applied to the object to be coated in solution or from the melt, or in solid form according to the conventional methods such as painting, rolling, pouring, spraying, the fluidized bed process or the electrostatic powder spraying process.

The lacquers containing the polyisocyanates obtainable according to the invention produce films which adhere surprisingly well to a metallic base, and are particularly light-fast, color stable in the presence of heat and very resistant to abrasion. Furthermore, they are characterized by substantial hardness, elasticity, very good resistance to chemicals, high gloss, excellent weather resistance and good pigmenting qualities.

The invention is further illustrated, but is not intended to be limited by the following examples in which all parts and percentages are by weight unless otherwise specified.

EXAMPLES

In the following examples, the following starting materials are used:

Diisocyanate I
(1-isocyanato-1-methyl-4(3)-isocyanatomethyl cyclohexane)

(a) Production of 1-amino-1-methyl-4(3)-aminomethyl cyclohexane 605 g 4(5)-cyano-1-methyl cyclohexene were dissolved in a stirring autoclave in 500 ml of liquid ammonia and hydrogenated over 40 g of Raney nickel iron at 90° C. and under a hydrogen pressure of 100 bar. After evaporating off the ammonia and filtering off the catalyst, distillation under vacuum took place. 550 g (88%) of 4(5)-aminomethyl-1-methyl cyclohexene, boiling point at 10 mbar of from 78° to 80° C., were obtained. The weight ratio of the 4- and 5-isomers was about 80:20.

At 50° C., 327 g of this unsaturated amine and 78 g of hydrocyanic acid were simultaneously added dropwise to 675 g of 80% sulphuric acid and subsequently stirred for 3 h at 50° C. 1320 g of 50% sodium hydroxide solution was added dropwise at 20° to 90° C. and heated for 3 h to reflux. 800 ml of 2-methyl-1-propanol were added and then the organic phase was separated and distilled under vacuum. 331 g (89%) of 1-amino-1-methyl-4(3)-aminomethyl cyclohexane were obtained having a boiling point at 10 mbar of from 95° to 105° C.

(b) Production of 1-isocyanato-1-methyl-4(3)-isocyanato-methyl cyclohexane

A solution of 213 g of 1-amino-1-methyl-4(3)-aminomethyl cyclohexane in 3.3 l of chlorobenzene was added dropwise to a solution of 800 g of phosgene in 3.3 l of chlorobenzene at 0° to 20° C. The mixture was heated to 90° C. over a period of 2 h while continuously passing through phosgene. Phosgenation took place for an additional 3 h at 90° C. and for 2 h under reflux. The phosgene was then blown out with nitrogen and the mixture was distilled under vacuum. 265 g (91%) of 1-isocyanato-1-methyl-4(3)-isocyanatomethyl cyclohexane 5 were obtained having a boiling point at 0,1 mbar of from 98° to 103° C.

Weight ratio of the 4- and 3-isomers about 80:20.

Diisocyanate II
(1-isocyanato-1,4(3)-dimethyl-4(3)-isocyanato-methyl cyclohexane)

(a) Production of 1-amino-1,4(3)-dimethyl-4(3)-aminomethyl cyclohexane 600 g of 4(5)-cyano-1,4(5)-dimethyl cyclohexene were dissolved in a stirring autoclave in 300 ml of liquid ammonia and hydrogenated over 40 g of Raney nickel iron at 90° C. and under a hydrogen pressure of 100 bar. After evaporating off the ammonia and filtering off the catalyst, distillation took place under vacuum. 540 g (87%) of 4(5)-aminomethyl-1,4(5)-dimethyl cyclohexene, boiling point at 10 mbar of from 75° to 78° C., were obtained. The weight ratio of the 4- and 5-isomers was about 70:30.

At 40° C., 520 g of this unsaturated amine and 111 g of hydrocyanic acid were simultaneously added dropwise to 1240 g of 80% sulphuric acid and subsequently stirred for 3 h at 40° C. 1800 g of 45% sodium hydroxide solution are added dropwise at 20° to 90° C. and heated to reflux for 3 h. 700 ml of chlorobenzene were added and the organic phase was separated at 80° C. and distilled under vacuum. 493 g (85%) of 1-amino-1,4(3)-dimethyl-4(3)-aminomethyl cyclohexane, boiling point at 10 mbar of from 90° to 105° C., were obtained.

(b) Production of 1-isocyanato-1,4(3)-dimethyl-4(3)-isocyanatomethyl cyclohexane A solution of 312 g of the above-described diamine in 2 l of chlorobenzene was added dropwise at 0° to 20° C. to a solution of 1300 g of phosgene in 4.5 l of chlorobenzene. The mixture was heated to 90° C. over a period of 2 h while continuously passing through phosgene. Phosgenation took place for an additional 3 h at 90° C. and for 2 h under reflux. The phosgene was then blown out with nitrogen and the mixture was distilled under vacuum. 337 g (81%) of 1-isocyanato-1,4(3)-dimethyl-4(3)-isocyanatomethyl cyclohexane, boiling point at 0,1 mbar of from 88° to 90° C., were obtained. Weight ratio of the 4- to 3-isomers about 70:30.

Catalyst I.

10% solution of 2-hydroxypropyl triethylammonium hydroxide in 2-ethyl-1,3-dihydroxyhexane/1,3-dihydroxybutane (weight ratio of the solvent 4:1).

EXAMPLE 1

A mixture of 1746 g of diisocyanate I and 168 g of 1,6-diisocyanato-hexane (molar ratio =90:10) was treated at 50° C. with 40 ml of catalyst solution I. The exothermic reaction mixture was initially kept at 60° C. by cooling and was later kept at this temperature by heating. After achieving an NCO content of 29%, the temperature was kept at 80° C. until an NCO content of 20.5% was achieved after 5 h. Subsequent stirring then took place for 30 minutes at 110° C. and the reaction mixture was poured onto a sheet. After cooling to room temperature a clear solid resin was present with an NCO content of 18.6% (corresponding to a degree of trimerization of 56.6%) and a melt range of from 70° to 80° C. The content of monomeric diisocyanate I is below 1%, the content of monomeric 1,6-diisocyanatohexane is below the detection limit, i.e. below 0.03%.

EXAMPLE 2

1358 g of diisocyanate I and 504 g of 1,6-diisocyanatohexane (molar ratio =70:30) were treated at 50° C. with 40 ml of catalyst solution I. The reaction mixture was initially kept at 60° C. for 2 h until an NCO content for the mixture of 26.1% was achieved. The mixture was then kept at 80° C. for 1.5 h until an NCO content of 17.8% was established. The mixture was finally subsequently stirred for 0.5 h at 110° C. and poured onto a sheet. After cooling to room temperature, a glassy solidified solid resin was present with an NCO content of 15.1% (corresponding to a degree of trimerization of 66.5%) and a melt range of 80° to 85° C. The content of diisocyanate I in the reaction product was below 1%. The content of 1,6-diisocyanatohexane was below the detection limit.

EXAMPLE 3

A mixture of 332.8 g of diisocyanate II and 67.2 g of 1,6-diisocyanatohexane (molar ratio =80:20) was treated at 50° C. with 8 ml of catalyst solution I. The reaction mixture was initially kept at 60° C. for 3 h until an NCO content of 28.2% was achieved and then for a further 2 h at 80° C. until an NCO content of 16.9% was achieved. Subsequent stirring took place for 30 min at 110° C. The mixture was poured onto a sheet and a clear solid resin with an NCO content of 16.0% (corresponding to a degree of trimerization of 61.9%) and with a melt range of from 60° to 70° C. was obtained after cooling to room temperature.

EXAMPLE 4

(use)

51 parts by weight of a hydroxyl group-containing polyester based on 58.2 parts by weight of terephthalic acid, 33.3 parts by weight of neopentyl glycol, 4.6 parts by weight of 1,6-dihydroxyhexane and 3.4 parts by weight of trimethylolpropane having an OH number of 50 and a hydroxyl equivalent weight of 1120, 9 parts by weight of the isocyanurate group-containing polyisocyanate obtained according to Example 1 and 40 parts by weight of a commercial titanium dioxide pigment were melted in an extruder at about 120° C. and homogenized. The polyhydroxy polyester and the polyisocyanate were metered in equal amounts based on equivalents. When the melt had solidified, the product was ground and applied onto test sheets by means of an electrostatic spraying device and hardened within 10 minutes at 180° C.

With a layer thickness of 56 to 58 μm, the following lacquer-technical properties were determined:
Gloss: 91% (Gardner, 60° angle of reflection)
Breaking test: 0 (0 = no change, 2 = torn)
Lattice cut: GT 0/0 (DIN 53 151, 0=no loss of adhesion, 4=total loss of adhesion, 1st.value before tearing off adhesive tape, 2nd value after tearing off adhesive tape)
Cupping index: >10 mm (DIN 53 156)
Impact (rev.): 80 inch pound (92 cmkg) (ASTM D 2794, Erichsen type 304, sphere diameter 15.8 mm)
Whiteness: 80.9 after 20 min/220° C. 70.7 (according to Berger/Elrephomat)
Gelling time: 140 sec/180° C. (DIN 55 990 part 8, point 5.1)
Pourability: pourable up to 50° C. (DIN 55 990 part 7, 2 weeks at 45° and 50° C.)

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A polyisocyanate containing at least one isocyanurate group and prepared by catalytically trimerizing a portion of the isocyanate groups of an organic diisocyanate mixture comprising
   (a) an aliphatic-cycloaliphatic diisocyanate having an NCO content of about 20 to 50% by weight, and also having a sterically unhindered isocyanate group bound to a primary aliphatic carbon atom and a sterically hindered isocyanate group bound to a tertiary carbon atom which forms part of a cycloaliphatic ring system and
   (b) 1,6-diisocyanatohexane in a positive quantity of up to about 50 mol % of HDI, based on the total quantity of components (a) and (b)
and optionally terminating the trimerization reaction at the desired degree of trimerization by adding a catalyst poison and/or by thermally deactivating the catalyst.

2. The polyisocyanate of claim 1 wherein component (a) comprises a diisocyanate of the formula

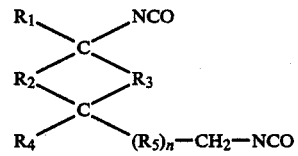

wherein
R₁ represents an alkyl radical having from 1 to 4 carbon atoms,
R₂ and R₃ represent identical or different, straight or branched, bivalent saturated carbon radicals having from 1 to 4 carbon atoms,
R₄ represents hydrogen or an alkyl radical having from 1 to 4 carbon atoms,
R₅ represents a straight or branched, saturated bivalent hydrocarbon radical having from 1 to 4 carbon atoms and
n represents 0 or 1.

3. The polyisocyanate of claim 1 wherein component (b) is used in a quantity of about 5 to 30 mol % based on the total mixture of components (a) and (b).

4. The polyisocyanate of claim 2 wherein component (b) is used in a quantity of about 5 to 30 mol % based on the total mixture of components (a) and (b).

5. The polyisocyanate of claim 1 wherein the trimerization reaction is terminated when at least about 50% of the isocyanate groups of component (a) have been trimerized.

6. The polyisocyanate of claim 1 wherein component (a) comprises 1-isocyanato-1-methyl-4(3)-isocyanatomethyl cyclohexane.

7. The polyisocyanate of claim 3 wherein component (a) comprises 1-isocyanato-1-methyl-4(3)-isocyanatomethyl cyclohexane.

* * * * *